(12) United States Patent
Sladkov et al.

(10) Patent No.: US 11,099,009 B2
(45) Date of Patent: Aug. 24, 2021

(54) IMAGING APPARATUS AND IMAGING METHOD

(71) Applicant: Sony Semiconductor Solutions Corporation, Kanagawa (JP)

(72) Inventors: Maksym Sladkov, Stuttgart (DE); Jeroen Hermans, Stuttgart (DE)

(73) Assignee: Sony Semiconductor Solutions Corporation, Kanagawa (JP)

(*) Notice: Subject to any disclaimer, the term of this patent is extended or adjusted under 35 U.S.C. 154(b) by 200 days.

(21) Appl. No.: 16/296,930

(22) Filed: Mar. 8, 2019

(65) Prior Publication Data

US 2019/0304115 A1    Oct. 3, 2019

(30) Foreign Application Priority Data

Mar. 29, 2018 (EP) .................................... 18165140

(51) Int. Cl.
*G06T 7/579* (2017.01)
*G01B 11/25* (2006.01)
*G01S 17/894* (2020.01)

(52) U.S. Cl.
CPC ........ *G01B 11/2513* (2013.01); *G01B 11/254* (2013.01); *G01B 11/2545* (2013.01); *G01S 17/894* (2020.01); *G06T 7/579* (2017.01)

(58) Field of Classification Search
CPC ........... G06T 7/579; G06T 2207/10152; G06T 7/521; G01B 11/254; G01B 11/2545; G01B 11/2513; G01S 17/894
See application file for complete search history.

(56) References Cited

U.S. PATENT DOCUMENTS

| | | | |
|---|---|---|---|
| 9,514,522 B2 | 12/2016 | Fu et al. | |
| 2014/0168424 A1* | 6/2014 | Attar | H04N 5/247 348/140 |
| 2015/0062558 A1 | 3/2015 | Koppal et al. | |
| 2016/0205378 A1 | 7/2016 | Nevet et al. | |
| 2016/0335778 A1* | 11/2016 | Smits | G01P 3/36 |
| 2019/0079192 A1* | 3/2019 | Fenton | G01S 17/42 |

OTHER PUBLICATIONS

Salinas et al., A New Approach for Combining Time-of-Flight and RGB Cameras Based on Depth-Dependent Planar Projective Transformations. Sensors. 2015; 15(9):24615-43. doi: 10.3390/s150924615, 18 pages.

\* cited by examiner

*Primary Examiner* — Phuoc Tran
(74) *Attorney, Agent, or Firm* — Wolf, Greenfield & Sacks, P.C.

(57) ABSTRACT

An imaging apparatus includes a circuitry configured to perform depth analysis of a scene by time-of-flight imaging and to perform motion analysis in the scene by structured light imaging, wherein identical sensor data is used for both, the depth analysis and the motion analysis.

15 Claims, 3 Drawing Sheets

IMAGING APPARATUS AND IMAGING METHOD

CROSS REFERENCE TO RELATED APPLICATIONS

The present application claims priority to European Patent Application 18165140.7 filed with the European Patent Office on Mar. 29, 2018, the entire contents of which is incorporated herein by reference.

TECHNICAL FIELD

The present disclosure generally pertains to an imaging apparatus and an imaging method using time-of-flight (To F) imaging.

TECHNICAL BACKGROUND

Generally, time-of-flight (ToF) imaging is known to determining a depth map of a target in a scene. The depth map is typically constructed based on a roundtrip time of light emitted by a projection device and reflected at the target.

It is further known that motion of the target in the scene and/or of a ToF sensor and/or intermittent appearance of other objects, e.g. rain drops, dust particles and the like, during the filming can negatively affect a result of ToF imaging either by introducing various types of errors like blur, inter-subframe phase inconsistency (e.g. an observed change in the phase that would contradict inter-subframe phase stepping) and the like in the depth map or by interfering with the service tasks that the ToF sensor must perform, for example flickering detection, multicamera detection and the like.

Motion of the target and/or the ToF sensor may be recognized in a ToF measurement and result in erroneous measurements. The erroneous measurements must be, as minimum, labelled as such (e.g. for providing a functional safety according to ISO 26262) or corrected. Current labelling/correction efforts do rely on the intrinsic correlation between the 4-components sub-frames used to reconstruct the depth map. This strategy often fails, especially, when this correlation was already exploited for the other tasks, that is, for flickering detection, multicamera detection and/or the like.

Although there exist techniques for ToF imaging, it is generally desirable to improve ToF imaging.

SUMMARY

According to a first aspect the disclosure provides an imaging apparatus including a circuitry configured to perform depth analysis of a scene by time-of-flight imaging and to perform motion analysis in the scene by structured light imaging, wherein identical sensor data is used for both, the depth analysis and the motion analysis.

According to a second aspect the disclosure provides an imaging method, comprising: performing depth analysis of a scene by time-of-flight imaging; and performing motion analysis in the scene by structured light imaging, wherein identical sensor data is used for both, the depth analysis and the motion analysis.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
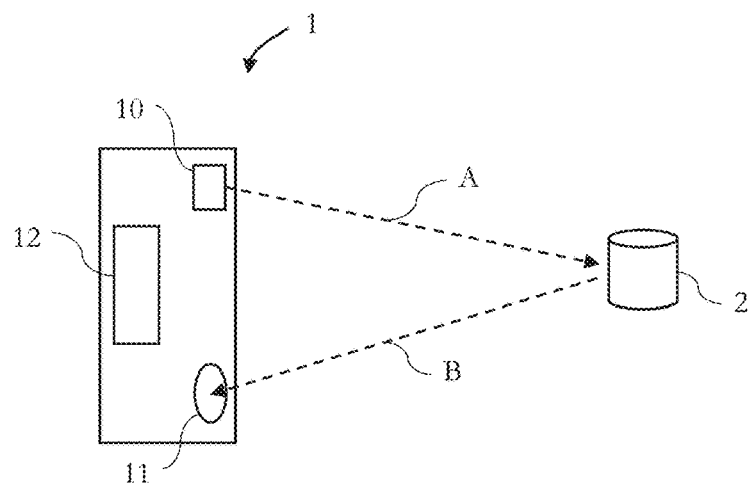
FIG. 1 shows an imaging apparatus including a circuitry according to one embodiment, the circuitry including a projector, a ToF sensor and a processor.

Before a detailed description of the embodiments under reference of FIG. 1, general explanations are made.

The present disclosure relates to an imaging apparatus including a circuitry. The circuitry may include one or more processors, logical circuits, a memory (read only memory and/or random access memory), a storage (hard disk), an interface (network, wireless, infrared, etc.), and the like.

The circuitry is configured to perform depth analysis of a scene by time-of-flight imaging (ToF imaging). Depth analysis may include determining a distance between a scene, preferably one or more targets in the scene, and a reference point, preferably a position at which a sensor providing sensor data for the depth analysis is located. Additionally or alternatively, depth analysis may include analyzing said distance between the scene and the reference point. For example, depth analysis may include constructing a depth map of the scene, preferably of the one or more targets in the scene. ToF imaging is typically based on a determination of changes of a light signal, preferably a visible light signal and/or an infrared light signal, projected onto the scene and reflected by the scene, preferably by the one or more targets. Furthermore, ToF imaging may include a determination of a distance between the scene and the reference point, preferably constructing a depth map, based on these changes of the light signal. The changes may include a time delay of the light signal due to the reflection or a time period necessary for the light to travel from a projection device, preferably a ToF light source, providing the light signal via the scene, preferably the one or more targets, to the sensor.

Furthermore, the circuitry is configured to perform motion analysis in the scene by structured light imaging, that is, by imaging other than the time-of-flight imaging. The structured light imaging may only be used for motion analysis, not for depth analysis or any other analysis. Motion analysis may include detecting a motion of the one or more targets of the scene and/or a motion of the sensor relative to the scene and, where applicable, determining one or more regions of motion in the scene. Structured light imaging is typically based on a projection of known light patterns onto a scene and an inspection of a change of an appearance of the pattern due to a reflection by the scene so as to determine a depth of the scene or a motion in the scene. During structured light imaging a change of a position of the one or more targets may be determined based on a difference between an expected light pattern for the case, that the target is not moved, and a detected light pattern. The light pattern projected to the scene may often be a light stripe pattern or a light spot pattern. Thus, a structured light context of the sensor data may be used as a measure of the motion in the scene independent from the TOF imaging.

The motion analysis may instead or in addition be performed by any imaging technique other than structured light imaging and ToF imaging suitable to perform motion analysis based on sensor data used for ToF imaging, for example stereo vision imaging or the like.

Stereo vision imaging typically uses two cameras and is based on triangulation for evaluation, for example, for determining a depth of the scene or even a motion in the scene. Furthermore, it is possible to perform the motion analysis by two or more types of imaging, e.g. by structured light imaging and stereo vision imaging.

The circuitry is configured to perform both, the depth analysis and the motion analysis, using identical sensor data. Thus, the circuitry preferably needs only one single set of sensor data, preferably the sensor data sensed by a time-of-flight sensor (ToF sensor), and no further sensor data, for example from an additional camera or sensor, is preferably needed to perform depth analysis and motion analysis.

Thus, motion in a scene may be reliably identified without additional measuring effort and a depth map to be constructed can be easily corrected based on a fusion of ToF imaging and structured light imaging, that is, imaging other than ToF imaging.

In some embodiments the sensor data may be provided by a time-of-flight sensor (ToF sensor) based on a light pattern projected onto the scene by a projection device, wherein the projected light pattern is received by the time-of-flight sensor as reflected light pattern. In other words, the sensor data may be a sensed light pattern, which is created by a light pattern projected onto the scene and reflected by the scene. Preferably, the light pattern projected onto the scene is one single light pattern, which preferably does not change with time. Thus, the sensor data may be based on one single light pattern projected by the projection device. The light pattern may have a wavelength in the visible wavelength range and/or infrared wavelength range, preferable in the infrared wavelength range.

The projection device may be configured to project the light pattern towards the scene, preferably towards the one or more targets in the scene. The projection device may include one or more light emitting elements like light emitting diodes and/or laser diodes for generating the light pattern. If necessary, the projection device may further include optical elements to generate the light pattern. The optical elements may include lenses, diffraction gratings, holographic or refractive optical elements or the like. Preferably, the projection device may include an array including multiple light emitting elements, or one or few light emitting elements especially shaped to generate the light pattern. The light emitting elements may output light having a wavelength is the visible wavelength range and/or infrared wavelength range, preferable in the infrared wavelength range.

The time-of-flight sensor may include a range imaging camera, as it is generally known, which may be based on charge-coupled device (CCD) technology, complementary metal oxide semiconductor (CMOS) technology, or the like. In some embodiments, the CMOS type sensor can be combined with the, generally known, Current Assisted Photonic Demodulator (CAPD) technology. The time-of-flight sensor may include an array of pixels, wherein each pixel includes one or more light detection elements, for example a photodiode. Each of the pixels may measure the time which the light has taken to travel from the projection device to the target and back to the pixel, for example, or another roundtrip delay which is indicative of the distance between the target and the imaging apparatus. The ToF sensor may comprise a light filter for filtering light of predetermined wavelengths, for example ultraviolet light and, where appropriate, visible light.

For example, the imaging apparatus may comprise the projection device and the sensor, preferably the ToF sensor. Alternatively, the projection device and/or the sensor may be separated elements, which are connected wirelessly or wired to the imaging apparatus.

In some embodiments the light pattern projected by the projection device to the scene may be a light spot pattern that may include multiple light spots (also called light dots). The light spot pattern may be regular or irregular. For example, the light spot pattern may be a regular matrix of multiple light spots (generally, spots may have any type of shape, e.g. linear, circular, elliptic, rectangular, any type of polygon, etc.) having the same or similar distance to each other or an irregular array of light spots. The light pattern may have a predefined border, e.g., rectangular, circular, elliptic, or the like. Using the light spot pattern the observed scene may be spatially encoded. While not being dense enough to act as a high-resolution structured light source, the light spot pattern still allows to deduce low-resolution depth information about the scene from observing a change in subsequently sensed light spot pattern.

Alternatively, the light pattern may be a light stripe pattern such as a raster of lines or curves for which spacing could be regular and/or orthogonal, or fully random, etc., and, thus, as discussed, the resulting light pattern may have also areas (light dots) having the form of, e.g., a raster of lines or curves, shapes (circular, elliptic, rectangular, polygon) for which spacing could be regular and/or orthogonal, or fully random, etc.

The light pattern is not limited to the mentioned light spot pattern or the light stripe pattern. Also other light pattern, for example grit type pattern, valley pattern or the like, may be used as light pattern. The valley pattern is typically a pattern, which is opposite to the above described light spot pattern.

In some embodiments a pattern of the structured light for the motion analysis may be the same pattern as the light pattern for the time-of-flight imaging. In other words, the light pattern projected to the scene and accordingly, the reflected light pattern sensed by the ToF sensor are the same for both, depth analysis by ToF imaging and motion analysis by structured light imaging. Accordingly, the reflected light pattern underlying the ToF imaging is also underlying the structured light imaging. Thus, no additional measurements other than the ToF measurements have to be carried out for the motion analysis by structured light imaging.

In some embodiments the imaging apparatus may be configured to correct a result of the depth analysis based on a result of the motion analysis. Thus, motion in the scene may be recognized and distinguished from the service tasks of the depth camera like flickering detection, multicamera detection and the like. The recognized motion may be considered, for example, when constructing the depth map. Particularly, the recognized motion may be important for implementing functional safety according to ISO 26262.

In some embodiments the sensor data may include at least one frame including subframes, wherein the imaging apparatus is configured to detect a motion information based on a disparity field for each subframe. The sensor data may preferably include a plurality of subsequent frames. Each frame may include several subframes, in particular 2n subframes, where n is a natural number, preferably 2, 4, 6 or 8 subframes, or 2n+1 subframes, preferably 3, 5 or 7 subframes. The subframes may be sensed based on a delay of an illumination modulation phase with respect to a sensor demodulation signal phase. For example, for a frame including 4 subframes, the delay of the illumination modulation phase may be 0° for the first subframe, 90° for the second subframe, 180° for the third subframe and 270° for the fourth subframe.

The motion information includes information on a position and an extension of a region of motion in the scene and thus, in the reflected light pattern. A motion may be considered at positions in the reflected light pattern, which change compared to an expected position, so that the change exceeds a threshold. Accordingly, the motion information may include positions in the reflected light pattern, which change more than the threshold.

As mentioned above, the observed scene may be spatially encoded using the light spot pattern and a low-resolution depth information may be deduced. The deduced low-resolution depth information is particularly important in case of ToF imaging based on more than one subframes, e.g. 4 subframes, where an encoded map will be available for each subframe, while depth analysis, preferably the ToF depth map, can only be computed, when the subframes of each frame, preferably all suitable subframes of each frame, are collected and processed. The deduced low-resolution depth information may be used for correcting errors in the depth maps constructed based on ToF imaging and/or for separating motion induced effects from other parasitic signals (e.g. flickering, multi-camera interferences and the like).

For a motion error detection it would be sufficient to simply calculate the local change in the disparity field between the subframes, while for the purpose of depth error correction the actual depth map from the disparity field may be evaluated, which is to be carried out by a computationally intensive step.

In some embodiments the disparity field may be for each light point of the light pattern indicative of a distance between an expected light point position and a measured light point position or whether said distance is larger than a threshold. The expected light point position may be a position, at which the light point is expected to appear in case that the corresponding position in the scene does not move. The disparity field may include for each light point of the light pattern a value, indicating said distance or a value indicating whether the distance exceeds the threshold.

For each subframe the disparity field (difference between the expected and measured dot's positions) may be calculated. The disparity fields may be compared between consecutive subframes and the regions in the image, where the disparity change exceeds the chosen threshold may be labelled as region of interest (ROI) with motions.

In some embodiments the imaging apparatus may be configured to construct a depth map using the subframes of a frame, preferably all subframes or the suitable subframes of the frame, and considering the detected motion information. The depth map may be constructed using all subframes or all suitable subframes of the frame and considering a change of the positions between the expected light point position (dot point) and the measured light point position of the single subframes. For example, the depth map may be generated based on 4 subframes of a frame including the 4 subframes. In the case that no motion is detected, an error determined during depth analysis may be identified as error, which is not caused by the motion in a scene. For example, the error may be an error caused by flickering, blur or the like.

This may be necessary, since, during the normal operation of the ToF camera the various synchronization clocks can run out of phase resulting in occasional subframes reporting erroneous signals. These effects, as infrequent as they are, are often indistinguishable from the camera motion effects. The use of the motion information allows independent arbitrage on whether the signal errors were caused by flickering or camera motion.

In some embodiments the imaging apparatus may be a mobile phone, a tablet, a smart watch, smart glasses, a head mounted display, a camera, preferably an automotive camera, a laptop or any other mobile device.

Summarizing, traditional structured light imaging relies on encoding the illuminated scene with an array of unique light spot patterns. For the fusion of ToF imaging and structured light imaging according to the present disclosure, the light pattern, preferably the light spot pattern, does not have to uniquely encode the scene, but the motion can be deduced locally by observing each spot in isolation. In particular, the structured light information is only used to augment/correct the depth analysis, in particular the ToF depth map.

The present disclosure further relates to an imaging method, comprising performing depth analysis of a scene by time-of-flight imaging and performing motion analysis in the scene by structured light imaging, wherein identical sensor data is used for both, the depth analysis and the motion analysis. Details described above with respect to the imaging apparatus may be applied analogously to the imaging method and a repetition thereof is omitted herein.

In some embodiments, the sensor data may be provided by a time-of-flight sensor based on a light pattern projected onto the scene by a projection device, preferably a light spot pattern, which is received by the time-of-flight sensor as reflected light pattern.

In some embodiments, a result of the depth analysis may be corrected based on a result of the motion analysis.

In some embodiments, a motion information may be detected based on a disparity field for each subframe of at least one frame including subframes. The disparity field may be for each light point of the light pattern indicative of a distance between an expected light point position and a measured light point position or whether said distance is larger than a threshold.

In some embodiments, a depth map may be constructed using the subframes of a frame and considering the detected motion information.

The method may be implemented as hardware solution (binary threshold bit) or as software solution. The disparity field may be easily calculated and evaluated (check against threshold) per subframe using the hardware digital signal processing unit to facilitated motion detection. Alternatively, the full depth map from the disparity field can be calculated in a software data path and used for not only motion detection, but also for the depth error corrections.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor causes the methods described herein to be performed.

Returning to FIG. 1, there is illustrated a set-up with an imaging apparatus including a circuitry 1 according to one embodiment in a surrounding, in which is positioned a target 2 to be analyzed. The circuitry 1 includes a projector 10, a ToF sensor 11 and a processor 12.

Figure 2:
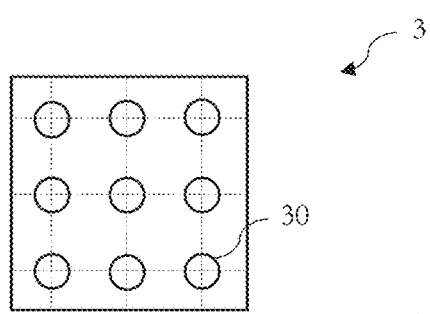
FIG. 2 exemplary shows a light spot pattern projected by the projector in form of a regular matrix of light spots.

The projector 10 is configured to project a light pattern towards the target 2 as indicated by arrow A. The light pattern is a light spot pattern 3 in form of a regular matrix of light spots 30 as shown by FIG. 2. The light spots 30 are arranged regularly at a predetermined distance from each other. The broken lines in FIG. 2 are not part of the light spot pattern, but illustrate the regularity of the light spot pattern 30. The projector 10 outputs this light spot pattern as modulated light signal.

Figure 3:
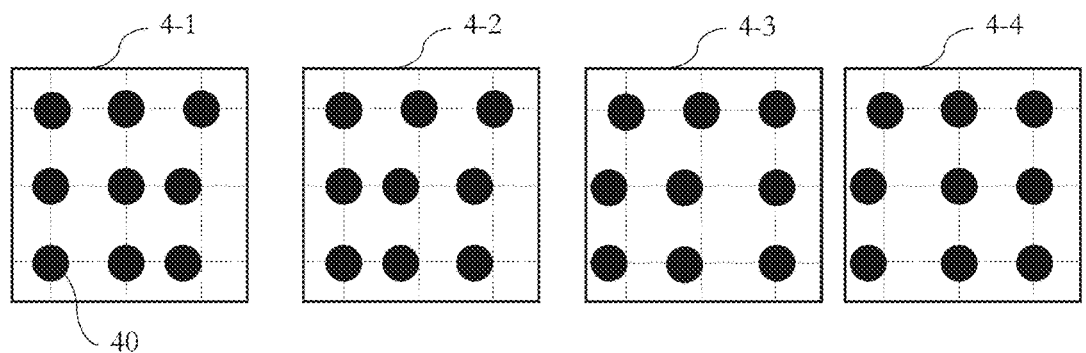
FIG. 3 exemplary shows four subframes, each representing a reflected light spot pattern corresponding to the projected light spot pattern of FIG. 2, the four subframes being sensed by the ToF sensor.

The ToF sensor 11 in FIG. 1 is a CMOS image sensor configured to sense single light points of a reflected light pattern corresponding to the projected light pattern after being reflected at the target as indicated by arrow B. The ToF sensor 11 receives subsequent frames. Each frame includes four subsequent subframes, which are based on a delay of an illumination modulation phase by 0°, 90°, 180° and 270° with respect to a sensor demodulation signal phase. The four subframes 4-1, 4-2, 4-3, 4-4 are illustrated in FIG. 3. Each of the four subframes 4-1, 4-2, 4-3, 4-4 represents a reflected light spot pattern, wherein the positions of the single light spots 40 are changes compared to the projected light spot pattern 3 and to the reflected light spot pattern of previous subframes. Again, the broken lines are not part of the reflected light spot pattern, but for simplifying recognition of the changes of the positions of the single light spots.

FIG. 3 shows that the vertically centered and lower right light spots in subframe 4-1 are shifted to the left compared to the projected light pattern 30. In the subframe 4-2 in addition the vertically centered and lower horizontally centered light spots are shifted to the left. In the subframe 4-3 the vertically centered and lower horizontally centered and left light spots are shifted to the left and in the subframe 4-4 the vertically centered and lower left light spots are shifted to the left. These shifts are of a dimension that they are recognized as motion of the target.

The processor 12 in FIG. 1 is configured to perform depth analysis of a scene by time-of-flight imaging and to perform motion analysis in the scene by structured light imaging, that is, imaging other than the time-of-flight imaging, wherein identical sensor data is used for both, the depth analysis and the motion analysis. Thereby, the processor 12 generates for each subframe 4-1, 4-2, 4-3, 4-4 based on the shift of the light spots 40 a disparity map 5-1, 5-2, 5-3, 5-4 using structured light imaging.

Figures 4, 5:
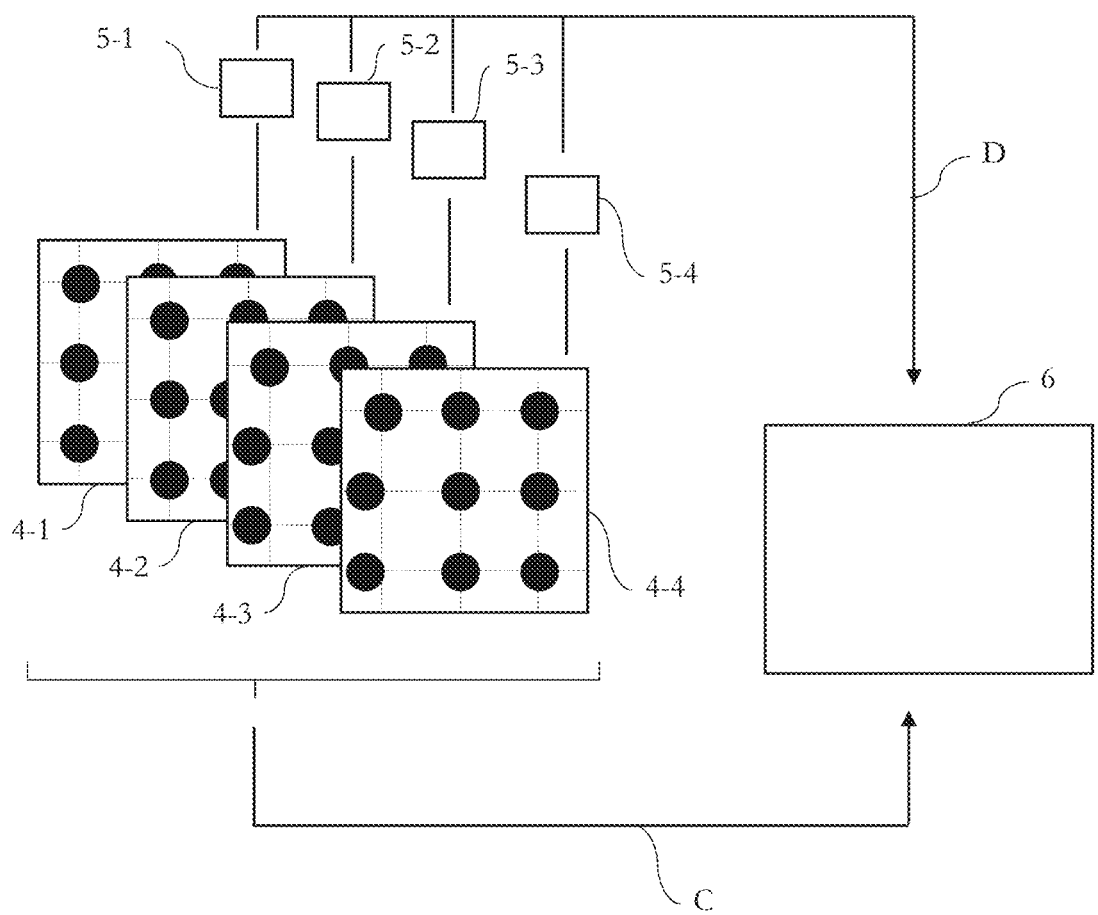
FIG. 4 shows a depth map constructed based on the four subframes and a motion information in a disparity map generated for each subframe by structured light imaging.
FIG. 5 exemplarily shows a disparity map generated by structured light imaging.

An example of a disparity map 5-4 corresponding to the change between the subframes 4-3 and 4-4 is presented by FIG. 5. In the disparity map 5-4 the digit 1 indicates that the change of the spot indicates a motion, and the digit 0 indicates that the change of the spot indicates no motion. The disparity map 5-4 indicates that the change of the positions of the vertically centered and lower left light spots between the frames 4-3 and 4-4 is larger than a threshold and thus represents a motion of the target 2 in the scene.

Furthermore, the processor 12 constructs a ToF depth map based on the four subframes 4-1, 4-2, 4-3, 4-4 of the frame as indicated by arrow C by ToF imaging.

Moreover, the processor 12 corrects the ToF depth map based on the disparity maps 5-1, 5-2, 5-3, 5-4 of each subframe 4-1, 4-2, 4-3, 4-4 as indicated by arrow D.

In other words, the ToF depth map is constructed from four subframes and a resulting depth map is affected by motion effects. Each of the subframes yields a disparity map that encodes the motion changes between subframes. Resulting depth map is a fusion between the disparity maps for each subframe generated by structured light imaging and the ToF depth map generated based on the four subframes of each frame by ToF imaging.

Figure 6:
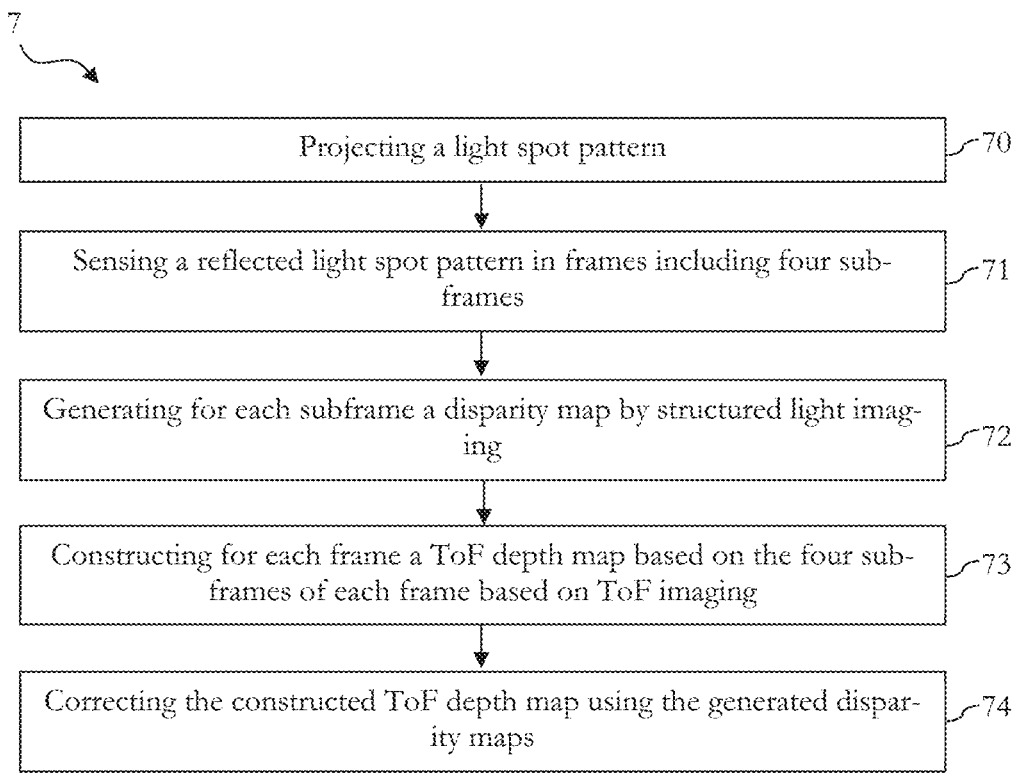
FIG. 6 shows a flowchart of an imaging method according to one embodiment being a fusion of ToF imaging and structured light imaging using identical sensor data.

FIG. 6 shows an imaging method 7, which can be carried out by the imaging apparatus 1 of FIG. 1. The imaging method 7 constitutes a fusion of ToF imaging and structured light imaging using identical sensor data.

At 70 the light spot pattern presented by FIG. 2 is projected in a modulated way onto the target 2 in the surroundings of the imaging apparatus.

At 71 frames with four subsequent subframes, each including a reflected light spot pattern, are received and sensed by the ToF sensor.

At 72 for each subframe a disparity map is generated by structured light imaging. Thereby, for each light spot in the reflected light spot pattern a change in the position of this light spot is analysed and, if the change exceeds a threshold, the digit 1 is entered in the disparity map that there is motion. Otherwise, the number 0 is entered in the disparity map.

At 73 for each frame a ToF depth map is constructed based on the four subframes of each frame based on ToF imaging.

At 74 the constructed ToF depth map is corrected using the generated disparity maps. Thereby, it is determined whether an error in the ToF depth map results from motion or any other effect and the ToF depth map is corrected accordingly.

It should be recognized that the embodiments describe methods with an exemplary ordering of method steps. The specific ordering of method steps is however given for illustrative purposes only and should not be construed as binding. For example the ordering of 72 and 73 in the embodiment of FIG. 6 may be exchanged. Other changes of the ordering of method steps may be apparent to the skilled person.

The method or parts thereof can also be implemented as a computer program causing a computer and/or a processor, such as processor 12 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Imaging apparatus including a circuitry configured to perform depth analysis of a scene by time-of-flight imaging and to perform motion analysis in the scene by structured light imaging, wherein identical sensor data is used for both, the depth analysis and the motion analysis.

(2) Imaging apparatus of (1), wherein the sensor data is provided by a time-of-flight sensor based on a light pattern projected onto the scene by a projection device, which is received by the time-of-flight sensor as reflected light pattern.

(3) Imaging apparatus of (2), wherein the light pattern projected by the projection device to the scene is a light spot pattern.

(4) Imaging apparatus of (2) or (3), wherein a pattern of the structured light for the motion analysis is the same pattern as the light pattern for the time-of-flight imaging.

(5) Imaging apparatus of any one of (1) to (4), wherein the imaging apparatus is configured to correct a result of the depth analysis based on a result of the motion analysis.

(6) Imaging apparatus of any one of (1) to (5), wherein the sensor data comprise at least one frame including subframes, wherein the imaging apparatus is configured to detect a motion information based on a disparity field for each subframe.

(7) Imaging apparatus of (6), wherein the disparity field is for each light point of the light pattern indicative of a distance between an expected light point position and a measured light point position or whether said distance is larger than a threshold.

(8) Imaging apparatus of (6) or (7), wherein the imaging apparatus is configured to construct a depth map using the subframes of a frame and considering the detected motion information.

(9) Imaging apparatus of any one of (1) to (8), wherein the imaging apparatus is a mobile phone, a tablet, a smart watch, smart glasses, a head mounted display, a camera or a laptop.

(10) Imaging method, comprising:
performing depth analysis of a scene by time-of-flight imaging; and
performing motion analysis in the scene by structured light imaging,
wherein identical sensor data is used for both, the depth analysis and the motion analysis.

(11) Imaging method of (10), wherein the sensor data is provided by a time-of-flight sensor based on a light pattern projected onto the scene by a projection device, which is received by the time-of-flight sensor as reflected light pattern.

(12) Imaging method of (11), wherein the light pattern projected by the projection device to the scene is a light spot pattern.

(13) Imaging method of (11) or (12), wherein a pattern of the structured light for the motion analysis is the same pattern as the light pattern for the time-of-flight imaging.

(14) Imaging method of any one of (10) to (13), further comprising:
correcting a result of the depth analysis based on a result of the motion analysis.

(15) Imaging method of any one of (10) to (14), wherein the sensor data comprise at least one frame including subframes, wherein the imaging apparatus is configured to detect a motion information based on a disparity field for each subframe.

(16) Imaging method of (15), wherein the disparity field is for each light point of the light pattern indicative of a distance between an expected light point position and a measured light point position or whether said distance is larger than a threshold.

(17) Imaging method of (15) or (16), further comprising:
constructing a depth map using the subframes of a frame and considering the detected motion information.

(18) A computer program comprising program code causing a computer to perform the method according to anyone of (10) to (17), when being carried out on a computer.

(19) A non-transitory computer-readable recording medium that stores therein a computer program product, which, when executed by a processor, causes the method according to anyone of (10) to (17) to be performed.

The invention claimed is:

1. An imaging apparatus comprising:
circuitry configured to perform depth analysis of a scene by time-of-flight imaging and to perform motion analysis in the scene by structured light imaging, wherein:
identical sensor data is used for both the depth analysis and the motion analysis,
the sensor data comprises at least one frame including subframes, and
the imaging apparatus is configured to detect motion information as a part of performing the motion analysis, the detection of motion information being based on a disparity field generated for each of the subframes.

2. The imaging apparatus of claim 1, wherein the sensor data is provided by a time-of-flight sensor based on a light pattern projected onto the scene by a projection device, which is received by the time-of-flight sensor as a reflected light pattern.

3. The imaging apparatus of claim 2, wherein the light pattern projected by the projection device to the scene is a light spot pattern.

4. The imaging apparatus of claim 2, wherein a pattern of structured light for the motion analysis is a same pattern as the light pattern for the time-of-flight imaging.

5. The imaging apparatus of claim 2, wherein the disparity field is generated for each light point of the light pattern and is indicative of a distance between an expected light point position and a measured light point position or is indicative of whether said distance is larger than a threshold value.

6. The imaging apparatus of claim 1, wherein the imaging apparatus is configured to correct a result of the depth analysis based on a result of the motion analysis.

7. The imaging apparatus of claim 1, wherein the imaging apparatus is configured to construct a depth map using the subframes and the detected motion information.

8. The imaging apparatus of claim 1, wherein the imaging apparatus is a mobile phone, a tablet, a smart watch, smart glasses, a head mounted display, a camera or a laptop.

9. An imaging method, comprising:
performing depth analysis of a scene by time-of-flight imaging;
performing motion analysis in the scene by structured light imaging, the motion analysis including detecting motion information, wherein:
the sensor data comprises at least one frame including subframes,
detecting the motion information is performed based on a disparity field generated for each of the subframes, and
identical sensor data is used for both the depth analysis and the motion analysis.

10. The imaging method of claim 9, wherein the sensor data is provided by a time-of-flight sensor based on a light pattern projected onto the scene by a projection device, which is received by the time-of-flight sensor as a reflected light pattern.

11. The imaging method of claim 10, wherein the light pattern projected by the projection device to the scene is a light spot pattern.

12. The imaging method of claim 10, wherein a pattern of structured light for the motion analysis is a same pattern as the light pattern for the time-of-flight imaging.

13. The imaging method of claim 10, wherein the disparity field is generated for each light point of the light pattern and is indicative of a distance between an expected light point position and a measured light point position or is indicative of whether said distance is larger than a threshold value.

14. The imaging method of claim 9, further comprising:
   correcting a result of the depth analysis based on a result of the motion analysis.

15. The imaging method of claim 9, further comprising:
   constructing a depth map using the subframes and the detected motion information.

\* \* \* \* \*